April 26, 1938.  P. DUPUY ET AL  2,115,158
SUSPENSION FOR VEHICLES
Original Filed May 14, 1932  2 Sheets-Sheet 1

INVENTORS
PIERRE DUPUY
JEAN MERCIER
BY Paul R Ames
ATTORNEY

April 26, 1938.  P. DUPUY ET AL  2,115,158
SUSPENSION FOR VEHICLES
Original Filed May 14, 1932   2 Sheets-Sheet 2
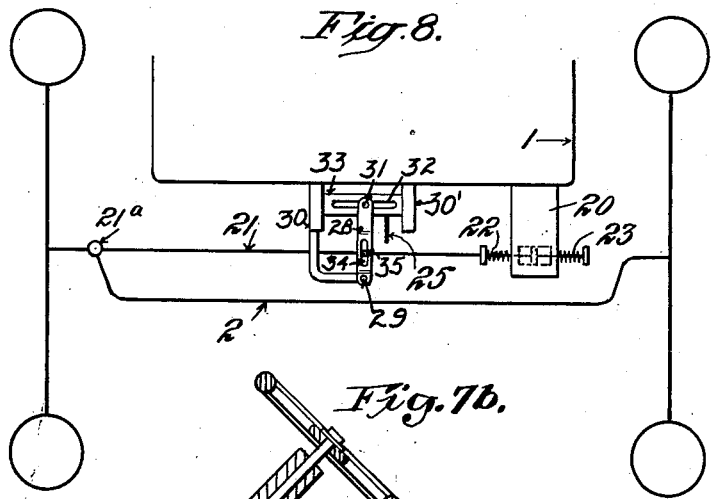
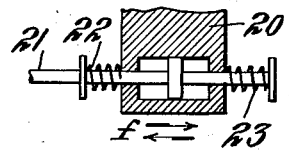
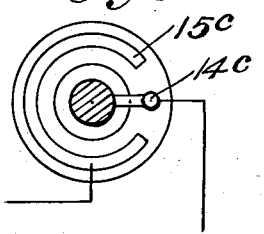
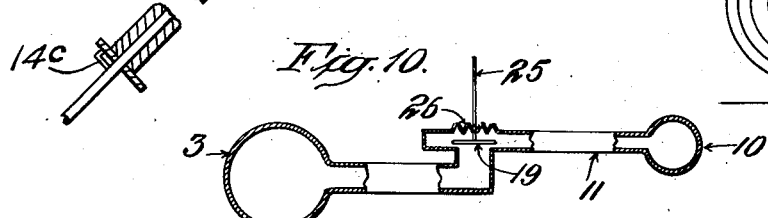
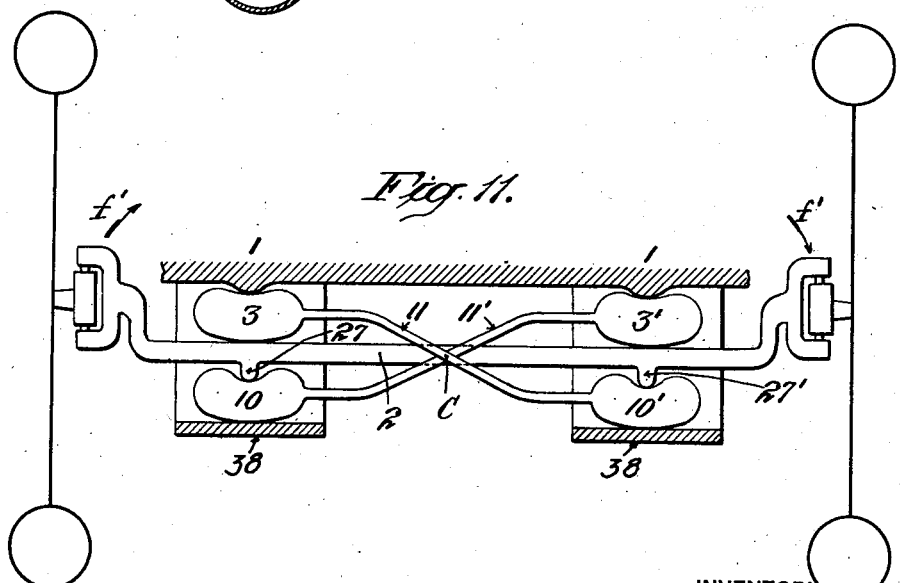
INVENTORS
PIERRE DUPUY
JEAN MERCIER
BY Paul R. Ames
ATTORNEY Patented Apr. 26, 1938

2,115,158

UNITED STATES PATENT OFFICE 2,115,158

SUSPENSION FOR VEHICLES

Pierre Dupuy and Jean Mercier, Paris, France

Application May 14, 1932, Serial No. 611,364. Renewed July 27, 1937. In France June 19, 1931

19 Claims. (Cl. 267—11)

This invention relates to pneumatic suspension devices for automobiles or other vehicles and particularly to one in which an elastic gas is contained under pressure in an enclosure which changes shape with the displacements of the non-suspended parts of the vehicle relative to the suspended parts.

It is an object of the invention to allow maximum comfort and riding qualities in the vehicle and to provide means whereby the suspension is controlled in such a way that the areas of the deformable container in contact with the suspended parts or with the parts not suspended or with each of such parts, vary with the relative position of the suspended and non-suspended parts in such a manner as to obtain any desired variation in flexibility.

It is also an object of the invention to provide means for cushioning the side motion of the vehicle. Further objects of the invention are to provide means for selectively controlling the vertical and angular movement of the vehicle relative to the wheels, and to provide automatic means for regulating the force opposing such motions.

Figure 1:
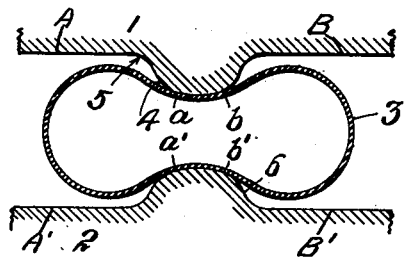
Figure 2:
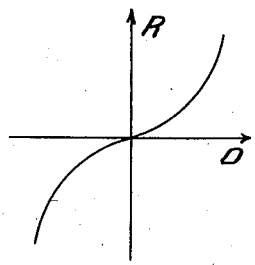
Figure 3:
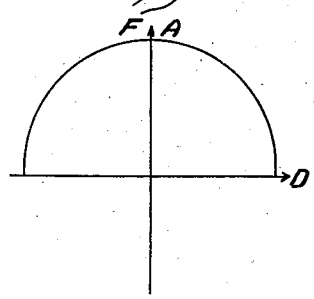

In the drawings, Figure 1 is a diagrammatic view illustrating an application of our invention. Figure 2 is a curve showing the relation between the force opposing displacement and the amount of displacement. Figure 3 is a curve illustrating the relation between the flexibility and the displacement from the normal position.

Figure 4:
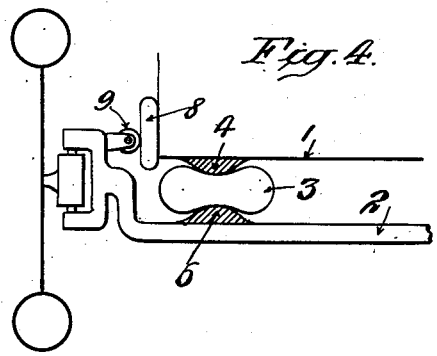
Figure 5:
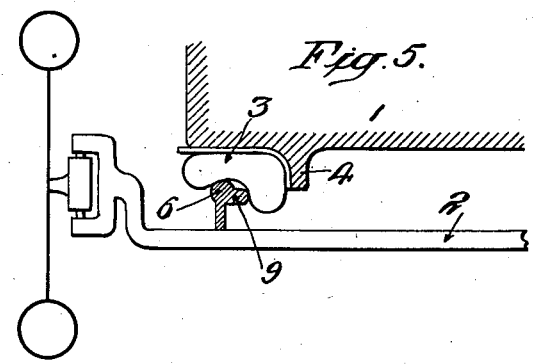
Figures 6, 7, 7A:
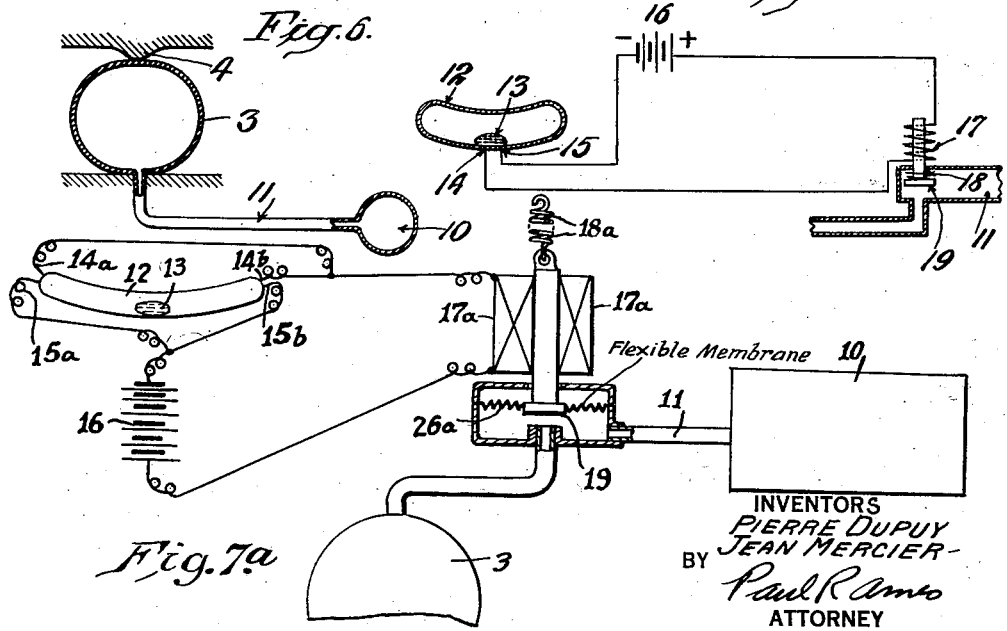

Figures 4 and 5 represent two variations of the invention providing means for opposing lateral displacement of the chassis. Figure 6 is a diagrammatic view of a modification of the invention comprising a deformable container combined with an additional capacity.

Figures 7 and 7a are diagrammatic illustrations of electrical devices operated by the centrifugal force of the vehicle in turning or swinging and arranged for use with the modifications shown in Figures 6 and 11 as an anti-rolling device. Figures 7b and 7c illustrate a switch operated by the steering device which may be substituted for the switch shown in Figure 7a. Figures 8, 9 and 10 are diagrammatic views showing means whereby a plunger such as that illustrated in Figure 7 may be mechanically operated.

Figure 11 is a diagrammatic view of another modification of our invention, providing an anti-rolling device as well as a cushioning suspension.

In utilizing our deformable containers to vary the resistance to deformation, we preferably form the sections of the suspended or non-suspended parts, or both, which come in contact with the container, in such a way that the areas of contact between the container and the suspended or non-suspended parts, or both, will vary in a predetermined manner. In the example illustrated in Figure 1 the numeral 1 designates a portion of the chassis at a location adjacent to one of the wheels, a similar arrangement being preferably provided adjacent each wheel of the vehicle. There is positioned between this portion of the chassis and the opposite portion of the axle 2, a deformable container 3, which is preferably of hollow rubber or other flexible material adapted to contain an elastic gas under pressure. The chassis is provided with a boss 4 joined to the underneath portion of the chassis at 5, which boss rests upon the deformable container 3. The container 3 in turn rests upon the boss 6 which is provided upon the upper portion of the axle and is suitably shaped to provide a proper cushioning effect.

In the normal position of the chassis 1 relative to the axle 2, the rubber bladder 3 is partly flattened between the bosses 4 and 6. In this position the boss attached to the chassis is in contact with the container 3 through the segment $a$—$b$ and the boss attached to the axle is in contact with the container 3 through the segment $a'$—$b'$. For small displacements of the axle either toward or away from the chassis, both segments $a$—$b$ and $a'$—$b'$ have practically the same surface area and the volume of the container 3 varies only slightly so that the pressure within the container is nearly constant. Under these conditions the forces exerted on the frame are substantially constant and the suspension is, therefore, nearly astatic, i. e., (indifferent equilibrium).

On the other hand, in the event of a considerable deflection of the container, as would be occasioned by the vehicle hitting a larger obstacle, the contact areas increase, for example to A—B and A'—B', respectively. Under these conditions the areas over which the pressure is applied are greatly increased so that the force exerted by the container under compression increases rapidly. Moreover, there is a further increase in force at the same time due to the greater decrease in volume of the deformable container as the axle and chassis approach one another. The shape of the bosses 4 and 6 may be varied to give the desired variation in resistance with increased deformation.

In the case of a considerable negative displacement, such as would be caused if the wheel passed over a hole in the road, the area of con-

the steering wheel or device, a switch such as shown in Figures 7b and 7c may be substituted for the mercury switch of Figure 7a. Thus, when the steering wheel is turned in either direction, the switch arm 14c contacts the electrode 15c energizing the coil 17a.

The action of centrifugal force or lateral force on the chassis and the body may also be transmitted to the suspension by a mechanical part which may be used to control the check valve 19 or other device for controlling the flow of the compressed gas in the connecting pipe or pipes 11. Such an arrangement is illustrated in Figures 8, 9, and 10 wherein a rod 21 is carried by the body 1. This rod 21 can slide in the guide 20 attached to the body 1 of the vehicle. Two springs 22 and 23 maintain the rod 21 in the middle portion under normal conditions. The other end of the rod 21 is joined at 21a to the axle 2. It is apparent that every displacement of the axle 2 relative to the body 1 in the direction of the arrows f (Figure 9) will bring about a displacement of the rod 21 relative to the body 1 and at the same time cause compression of the spring 22 or the spring 23, depending upon which direction the displacement takes place. The movement of this rod 21 and the considerable force which it puts into play can easily control the check valve or other similar part without the necessity of using a relay. For example, the lever 28 may be pivoted at 29 to the bracket 30 depending from the chassis 1. The upper end of the lever 28 may carry a pin or roller 31 adapted to slide or roll in the slot 32 in the slide block 33 adapted to slide up and down between the bracket 30 and the bracket 30' also fixed to the chassis 1. The lever 28 is provided with a slot 34 in which a pin or roller 35 carried by the rod 21 may slide or roll. When the rod 21 moves laterally relative to the chassis 1, in either direction, the lever 28 will swing about the pivot 29 and draws the block 33 downwardly so that the rod 25, actuated by the block 33, will close the valve 19 which may be sealed in the tube 11 by the flexible connection 26 (see Figure 10). Other means may, of course, be used for accomplishing this mechanical actuation of the valve 19.

The anti-rolling devices described above make the suspension stiff during turns.

The flexible cushion device described herein is particularly advantageous if used in connection with an anti-rolling device such as that described in French Patent No. 604,561 of January 13, 1925. Such an arrangement is shown in Figure 11 in which the two carrier cushions 3 and 3' are connected by the pipes 11 and 11' to the containers 10' and 10, respectively. The cushions 10 and 10' are supported by members 38 which are part of the chassis 1 and the axle 2 is carried between the two sets of containers. The axle may be provided with lugs 27 and 27', of any suitable shape, to give the desired variation in resistance to deformation.

With this arrangement any movement due to a vertical displacement of the axle toward the chassis will cause the containers 3 and 3' to be compressed and to discharge respectively into the containers 10' and 10. Since the same movement will expand the containers 10 and 10', the increase in volume will provide an increased elasticity in connection with such movement. The resistance in such a case depending upon the resistance to passage of the gas through the pipes 11 and 11'. In the event of a rolling motion of the chassis, the movement of the axle relative to the chassis will be a rotation about the center C. If the movement is in the direction of the arrows f', the containers 3 and 10' will be compressed and will so decrease in volume while the containers 3' and 10 will increase in volume and the rolling of the vehicle will be resisted. The reactions are produced very rapidly with the variations of pressure and of area on which the pressure acts, so that the rolling is limited to a minimum amount.

The modification of our invention shown in Figure 11 may be further improved by placing a four way valve in the pipes 11 and 11', for example, at a point opposite C. With such an arrangement, the containers 3' and 10 may be put into communication on the one hand and 3 and 10' into communication on the other hand, either manually or by suitable automatic means such as that previously described. When the vehicle is on a straight road and rolling is not feared, the four way valve may put the containers 3 and 10 into communication on the one hand and the containers 3' and 10' into communication on the other hand. Or the four way valve may be arranged to close both of the connecting pipes 11 and 11' to make each container act by itself when rolling is not feared and resistance to vertical displacement of the axle relative to the chassis is desired.

The valve C or any equivalent system of check valves or sliding valves may be controlled by any device, automatic or not. For example, a hand operated lever may be used, or the motion of the steering wheel or device or a device operated by the direction of movement, such as the rod 21 in Figures 8 and 9, may be used, or a pendulum or other device operating an electric relay, such as shown in Figure 7, may be adopted. The invention is by no means limited to the ways which we have represented and described and which have been chosen as examples only. Other adaptations may be used; for example, the invention may be applied to vehicles without an axle in which the axle is replaced by a movable member attached to the wheel, which member in turn rests on the elastic cushions.

No claims directed to the above modifications are included herein since these features are being claimed in applicants' copending application Serial No. 733,954, filed July 6, 1934.

It is apparent that the flexible containers described herein may be applied to a vehicle adjacent each of the wheels or in some cases a single container may be used for each axle. The terms used in describing the invention are used as terms of description and not as terms of limitation and it is intended that all equivalents of these terms be included within the scope of the invention claimed.

What we claim is:

1. A shock absorbing device comprising means for varying the volume of a fluid container by the movement of two portions of a vehicle relative to each other, an auxiliary capacity connected to said container, an electrically actuated valve in the connection between said container and said auxiliary capacity and a contact adapted to open and close the circuit of said electrically actuated valve, said contact including a curved tubular piece in which a drop of mercury is positioned and adapted to be moved toward one end or the other by the movement of the vehicle, and a non-conducting liquid surrounding said mercury drop to damp movements thereof.

2. A pneumatic shock absorbing device for vehicles comprising a deformable gas container positioned between two rigid surfaces attached to the body of a vehicle and the wheel supports thereof respectively, said container having a small portion of its area in contact with a convex projection on one of said surfaces when the vehicle is in a normal position with relation to the wheel supports with a major portion of said container offset laterally from said projection, and having a large portion of its area in contact with said convex projection and with the surface adjacent said projection when the vehicle is displaced toward the wheel supports.

3. A pneumatic shock absorbing device for vehicles comprising a deformable gas container positioned between two rigid surfaces attached to the body of a vehicle and the wheel supports thereof respectively, said container having small portions of its area in contact with convex projections on each of said surfaces when the vehicle is in a normal position with relation to the wheel supports with a major portion of said container offset laterally from said projection, and having large portions of its area in contact with said convex projections and with the surfaces adjacent said projections when the vehicle is displaced toward the wheel supports.

4. A pneumatic shock absorbing device for vehicles comprising a deformable gas container positioned between two rigid surfaces attached to the body of a vehicle and the wheel supports thereof respectively, said surfaces and said container being shaped to suddenly increase the area of said container in contact with said surfaces to substantially a maximum upon displacement of the vehicle toward the wheel supports.

5. A pneumatic shock absorbing device for vehicles comprising a deformable gas container positioned between two rigid surfaces attached to the body of a vehicle and the wheel supports thereof respectively, said container having a small portion of its area in contact with a convex projection on one of said surfaces when the vehicle is in a normal position with relation to the wheel supports, and having a large portion of its area in contact with said convex projection and with the surface adjacent said projection when the vehicle is displaced toward the wheel supports, a gas reservoir, a tube connecting said container and the reservoir, and means for regulating the flow of gas through said tube to and from said reservoir in accordance with the roll of said vehicle body.

6. A pneumatic shock absorbing device for vehicles comprising a deformable gas container positioned between two rigid surfaces attached to the body of a vehicle and the wheel supports thereof respectively, said surfaces and container being shaped to suddenly increase the area of the container in contact with the surfaces upon displacement of the vehicle toward the wheel supports, a gas reservoir, a tube connecting said container with said reservoir thereby forming a closed circuit for the gas, a valve in said tube, and an electromagnet for operating said valve.

7. A shock absorbing device as defined in claim 6, in which the electromagnet is operated by a contact made up of a curved tubular piece in which a drop of mercury is positioned and adapted to move toward one end or the other under the action of centrifugal force, said tubular piece having a pair of terminals of an electric circuit positioned so that said circuit is normally closed by the drop of mercury and opened by the displacement of the drop of mercury.

8. A shock absorbing device as defined in claim 6, in which the electromagnet is operated by a contact made up of a curved tubular piece in which a drop of mercury is positioned and adapted to move toward one end or the other under the action of centrifugal force, said tubular piece being provided with pairs of terminals connected with an electric circuit and positioned on opposite sides of the normal position of said drop of mercury.

9. A device in accordance with claim 4 in which the container is connected by a tube to a gas reservoir, said device having a valve for regulating the flow of gas through said tube, and means for controlling said valve.

10. A device in accordance with claim 4 in which the container is connected by a small tube to a gas reservoir, said device having a valve for regulating the flow of gas through said tube, and said valve being automatically controlled by movements of the steering device of the vehicle.

11. A device in accordance with claim 4 in which the container is connected by a small tube to a gas reservoir, said device having a valve for regulating the flow of gas through said tube, and said valve being controlled by mechanical means operated by movement of the body of the vehicle relative to the wheel supports.

12. A pneumatic shock absorbing device for vehicles comprising a deformable gas container positioned between two rigid surfaces attached to the body of a vehicle and the wheel supports thereof respectively, said container having a small portion of its area in contact with a convex projection on one of said surfaces when the vehicle is in a normal position with relation to the wheel supports, and having a large portion of its area in contact with said convex projection and with the surface adjacent said projection when the vehicle is displaced toward the wheel supports, a gas reservoir, a tube connecting said container and the reservoir, and means automatically controlled by movements of the steering device of the vehicle for regulating the flow of gas through said tube.

13. A pneumatic shock absorbing device for vehicles comprising a deformable gas container positioned between two rigid surfaces attached to the body of a vehicle and the wheel supports thereof respectively, said container having a small portion of its area in contact with a convex projection on one of said surfaces when the vehicle is in a normal position with relation to the wheel supports, and having a large portion of its area in contact with said convex projection and with the surface adjacent said projection when the vehicle is displaced toward the wheel supports, a gas reservoir, a tube connecting said container and the reservoir, and means operated by movement of the vehicle body relative to the wheel supports for regulating the flow of gas through said tube.

14. A pneumatic shock absorbing device for vehicles having a steering device comprising a deformable gas container positioned between two rigid surfaces attached to the body of a vehicle and the wheel supports thereof respectively, a gas reservoir, the container being connected by a small tube to said gas reservoir, a valve for regulating the flow of gas through said tube, and means for automatically controlling said valve by the movements of the steering device of the vehicle.

15. A pneumatic shock absorbing device for vehicles comprising a deformable gas container positioned between two rigid surfaces attached to the body of a vehicle and the wheel supports thereof respectively, a gas reservoir, the container being connected by a tube to said gas reservoir and forming therewith a closed circuit for the gas, said shock absorbing device having moreover a valve for regulating the flow of gas through said tube, and said valve being controlled by mechanical means operated by small lateral movements of the body of the vehicle relative to the wheel supports which occur before any real rolling movement of the vehicle takes place.

16. A pneumatic shock absorbing device for vehicles comprising a deformable gas container positioned between two rigid surfaces attached to the body of a vehicle and the wheel supports thereof respectively, a gas reservoir, a tube connecting said container with said reservoir thereby forming a closed circuit for the gas, a valve in said tube, and an electromagnet for operating said valve, said electromagnet being operated by a contact made up of a curved tubular piece in which a drop of mercury is positioned and adapted to move toward one end or the other under the action of centrifugal force, said tubular piece having a pair of terminals of an electric circuit positioned so that said circuit is normally closed by the drop of mercury and opened by the displacement of the drop of mercury.

17. A device as defined in claim 16 including means for damping movement of the mercury drop.

18. A pneumatic shock absorbing device for vehicles comprising a deformable gas container positioned between two rigid surfaces attached to the body of a vehicle and the wheel supports thereof respectively, a gas reservoir, a tube connecting said container with said reservoir thereby forming a closed circuit for the gas, a valve in said tube, and an electromagnet for operating said valve, said electromagnet being operated by a contact made up of a tubular piece in which a drop of mercury is positioned and adapted to move toward one end or the other under the action of centrifugal force, said tubular piece being provided with pairs of terminals connected with an electric circuit and positioned on opposite sides of the normal position of said drop of mercury.

19. A pneumatic shock absorbing device comprising means for varying the volume of a fluid container by the movement of two portions of a vehicle relative to each other, an auxiliary capacity connected to said container, an electrically actuated valve in the connection between said container and said auxiliary capacity, and a contact adapted to open and close the circuit of said electrically actuated valve, said contact including a curved tubular piece in which a drop of mercury is positioned and adapted to be moved toward one end or the other by the movement of the vehicle, said tubular piece being provided with pairs of terminals connected with an electric circuit and positioned on opposite sides of the normal position of said drop of mercury.

PIERRE DUPUY.
JEAN MERCIER.